United States Patent [19]

Tsuboi et al.

[11] 4,327,313
[45] Apr. 27, 1982

[54] CONTROL APPARATUS FOR ELECTRIC CAR

[75] Inventors: Takashi Tsuboi; Shigetoshi Okamatsu; Masahiko Ibamoto; Hiroshi Narita, all of Katsuta; Eiji Kozu, Mito, all of Japan

[73] Assignee: Hitachi, Ltd., Tokyo, Japan

[21] Appl. No.: 125,755

[22] Filed: Feb. 29, 1980

[30] Foreign Application Priority Data

Mar. 5, 1979 [JP] Japan ................................. 54-24485

[51] Int. Cl.³ ............................................. H02P 5/46
[52] U.S. Cl. ................................... 318/52; 318/806;
318/808
[58] Field of Search .................... 318/798–803,
318/808–811, 52, 806; 180/197, 54 R

[56] References Cited
U.S. PATENT DOCUMENTS 3,680,655 8/1972 Beyerlein et al. ................. 180/54 R
3,916,275 10/1975 Plunkett ............................. 318/808
4,044,285 8/1977 Plunkett et al. .................... 318/808
4,066,938 1/1978 Turnbull ............................ 318/808
4,075,538 2/1978 Plunkett ............................. 318/52
4,095,147 6/1978 Mountz ............................. 180/197
4,136,303 1/1979 Almquist et al. .................. 318/52

Primary Examiner—Gene Z. Rubinson
Attorney, Agent, or Firm—Craig and Antonelli

[57] ABSTRACT

A control apparatus is disclosed for an electric car having an induction motor supplied with polyphase AC power of variable frequency from a power converter so as to drive a driving wheel. This control apparatus comprises a detector for detecting the actual running speed of the electric car irrespective of whether the driving wheel causes adhesion or non-adhesion, a device for establishing a slip frequency of the induction motor, and a device for generating a frequency command based upon a signal of the actual running speed and the slip frequency, this frequency command being used to control the output frequency of the power converter.

15 Claims, 6 Drawing Figures

CONTROL APPARATUS FOR ELECTRIC CAR

BACKGROUND OF THE INVENTION

The present invention relates to an improvement of a control apparatus for an electric car, and particularly to a control apparatus for an electric car driven by an induction motor.

The use of an induction motor for driving an electric car not only improves reliability due to no use of rectified current to the motor, but also improves adhesion property of the electric car because the induction motor has a constant speed characteristic such that, the speed of the motor is kept substantially constant when the frequency of an applied AC voltage is constant. Thus, realization of an induction motor driving electric car system has been expected for a long time.

However, the realization is delayed because of the necessity of a power converter as a polyphase AC power supply capable of widely controlling the frequency and voltage, for example, an inverter or a cycloconverter.

Recently, with the development of semiconductors such as thyristors, gate turn-on thyristors, there has been available a power converter satisfying the above control requirements, and thus an electric car using an induction motor has been put into practical use.

To supply polyphase AC power of variable frequency and variable voltage to an induction motor, a DC to AC converter is mounted on the car in the case of DC electric railway, or an AC to AC converter (cycloconverter) or both AC to DC and DC to AC converters are mounted thereon in the case of AC electric railway.

These power converters take one of the following control systems in the constant torque mode of powering or regenerative braking for accelerating or decelerating the electric car:

(1) a control system in which the ratio (v/f) of the voltage v to the frequency f is made constant and the slip frequency $f_s$ is maintained constant, so that the current I is substantially constant, (2) a control system in which the slip frequency $f_s$ and the current I are maintained constant, so that, the ratio (v/f) is substantially constant.

In either system, it is necessary to detect a speed frequency corresponding to the rotational speed of the induction motor in order to control the slip frequency $f_s$ constant.

In other words, in the powering operation, the output frequency of the converter is increased by the slip frequency $f_s$ with respect to the rotational speed signal $f_r$ of the induction motor, thereby generating an accelerating torque, and therefore the frequency command $f_p$ to be applied to the power converter is given by $$f_p = f_r + f_s \quad (1)$$

In the regenerative operation, the output frequency of the converter is decreased by the slip frequency $f_s$ with respect to the rotational speed ($f_r$) of the induction motor, thereby generating a decelerating torque, and therefore the frequency command $f_p$ to be applied to the power converter is given by $$f_p = f_r - f_s \quad (2)$$

For detection of this speed frequency $f_r$, there have been used a speed generator (tachometer generator), a pulse generaor or the like, connected to the induction motor.

Electric cars having induction motors have a remarkable advantage that, as described above, the adhesion property is improved by the constant speed characteristic of the induction motor. That is, as is apparent from the speed-torque characteristic of the induction motor, when the powering torque is too large the powering operation and the driving wheel skids, so that the motor tends to increase the rotational speed, the powering torque decreases, acting to prevent the skid of the wheel. On the other hand, when the braking torque is too large during the regenerative operation and the driving wheel slides, so that the rotational speed of the motor tends to decrease, the braking torque decreases, preventing the slide of the wheel.

However, if the output frequency f of the power converter is made equal to the frequency command $f_p$ determined by equations (1) and (2) by a frequency control system as described previously, a skid or slide once generated can not be suppressed.

The skid at the powering operation will now be considered. When a skid once occurs, increasing the rotational speed $f_r$ of the motor, the frequency command $f_p$ increases according to equation (1). Therefore, the speed-torque characteristic of the induction motor is moved in parallel toward the higher speed range, thus increasing the powering torque and promoting the skid.

Similarly, the slide at the regenerative operation can not be suppressed.

Thus, in the conventional frequency control system, the preferable characteristic of the induction motor is lost in effect by the action of the control system.

In electric cars, of course, there are provided a plurality of induction motors, and a plurality of driving wheels connected thereto, and therefore, like the system used in the conventional DC motor car, the minimum (at the powering operation) or maximum (at the regenerative operation) number of revolutions is used to determine the rotational speed $f_r$ in equation (1) or (2). In this way, even if some of the driving wheels cause skid or slide, this can be suppressed.

If, however, all the driving wheels cause skid or slide, these are promoted contrary to suppression thereof.

The suppression thereof can be achieved by providing an additional control system, but lowering reliability results in addition to increase in the complexity and cost of the system.

SUMMARY OF THE INVENTION

A railway electric car becomes more inexpensive as its power equipment is placed at one location to the greatest extent possible. Therefore, it is desirable to increase the power output in each induction motor thereby to decrease the number of motors to be used, and thus to decrease the number of motor cars in a train thereby increasing the number of train cars. To this end, it is necessary to improve the adhesion property of the motor cars, and it is desirable to cause recurrence of adhesion even though all the driving wheels cause skid or slide.

Accordingly, it is an object of the invention to provide a control apparatus for providing an excellent adhesion property in an electric car using an induction motor.

Thus, according to the present invention, there is provided a control apparatus for an electric car having an induction motor for driving a driving wheel by being supplied with polyphase AC power generated from power converter means, which control apparatus comprises means for detecting the actual running speed of the electric car irrespective of whether said driving wheel causes adhesion or non-adhesion, means for establishing the slip frequency of the induction motor, frequency command means for adding or subtracting the slip frequency to or from the actual running speed signal, and means for controlling the output frequency of the power converter means in accordance with the frequency command from the frequency command means.

In other words, in place of the rotational speed signal $f_f$ of the motor in equations (1) and (2), there is used a signal $f'_f$ of the actual speed of electric car, which is independent of skid or slide of the driving wheel.

Thus, it is possible to provide a control apparatus for an electric car which has an excellent adhesion property by capability of applying a desired frequency command $f_p$ to a power converter, even though the driving wheel cause any skid or slide and by use of the constant speed characterstic of the induction motor.

Another object of the present invention is to provide a control apparatus for an electric car capable of fast causing recurrence of adhesion in an induction motor car.

Thus, according to the invention, there is also provided a control apparatus for an electric car having an induction motor which is supplied with polyphase power from power converter means to drive a driving wheel, which control apparatus comprises frequency command means an output of which is suppressed in rapid variation due to the influence of skid or slide of the driving wheel, means for controlling the output frequency of the power converter means in accordance with the frequency command, means for predicting a current in the induction motor under condition that the driving wheel causes adhesion at least when the driving wheel causes non-adhesion, means for establishing a current command for the induction motor, and means for controlling the output voltage from the power converter means in response to a difference between the current command and the predicted current.

In other words, even though the driving wheel causes skid or slide, the frequency of the power converter means is not changed rapidly, and as the current feedback value to the current control system, there is used a predicted value of an imaginal motor current under the assumption of adhesion condition, but not the actual, rapidly decreasing motor current signal. Therefore, the output voltage from the power converter can be prevented from increasing, and faster recurrence of adhesion can be realized by best use of the constant speed characteristic of the induction motor.

Other objects, features and advantages of this invention will become apparent from the following description taken in conjunction with the accompanying drawings.

DETAILED DESCRIPTION OF THE PREFERRED EMBODIMENTS

Figure 1:
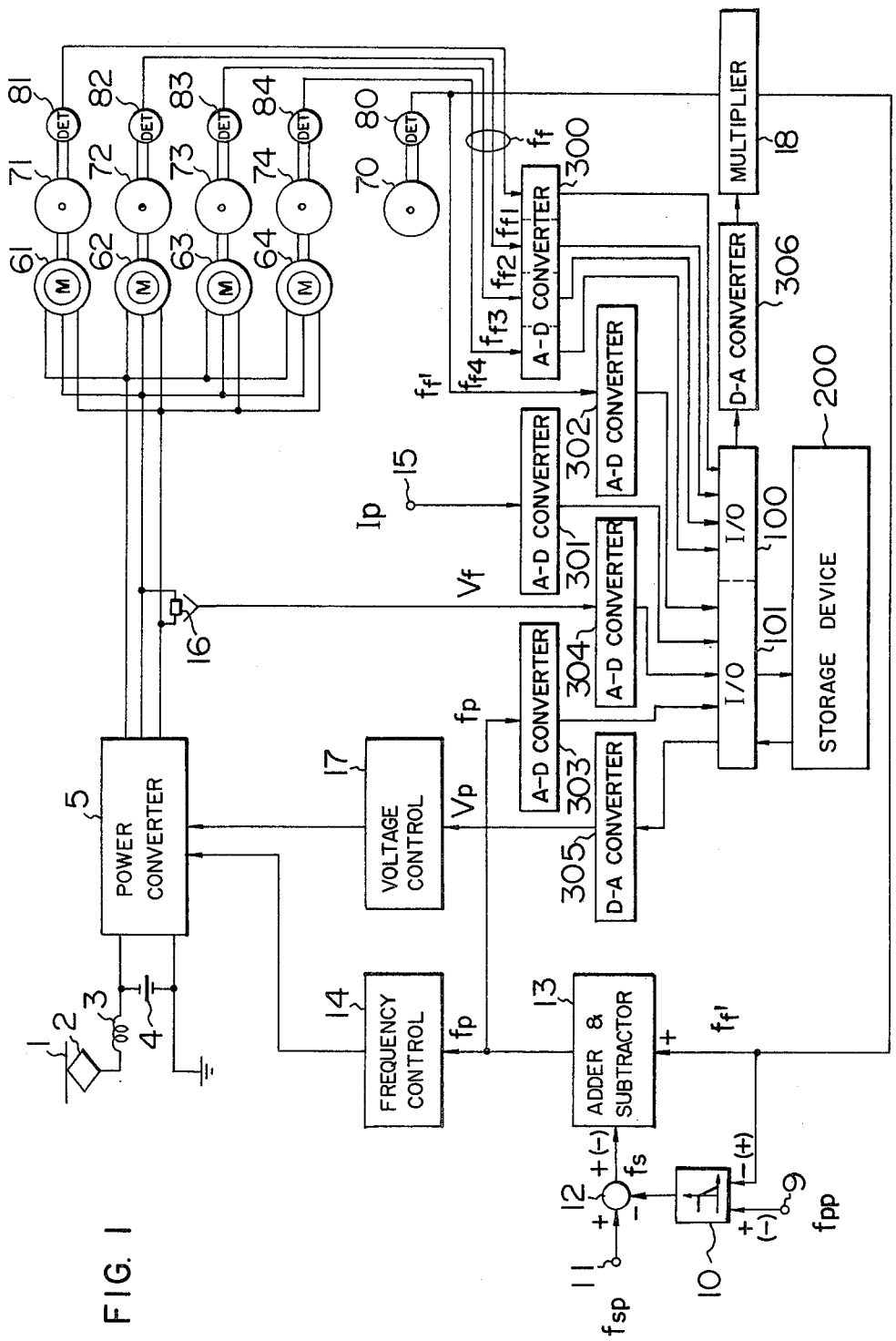
FIG. 1 is a block diagram of a preferred embodiment of a control apparatus for an electric car according to the invention.

Referring to FIG. 1, there is shown a trolley wire 1 from which the catenary voltage is collected by a pantograph 2. The collected voltage is supplied through a filter consisting of a reactor 3 and a capacitor 4 to a power converter 5. The power converter 5, as described above, serves to supply polyphase AC power of variable frequency and voltage, and it is composed of a DC to AC converter in a DC electric rail way and an AC to AC converter in an AC electric rail way.

The output of the power converter 5 is applied to a plurality of induction motors 61 to 64 to which driving wheels 71 to 74 are connected, respectively. Shown at 81 to 84 are speed detectors which are connected to the driving wheels 71 to 74 to produce signals $f_{f1}$ to $f_{f4}$ of the rotational speeds of the induction motors 61 to 64, respectively. To a trailing wheel 70 which is not connected with any induction motor, is connected a speed detector 80 according to the present invention. If it is assumed that in any case, no torque is applied to the trailing wheel 70, the output of the speed detector 80 indicates a signal $f'_f$ of actual running speed of an electric car regardless of the adhesion or non-adhesion of the driving wheels 71 to 74.

The driver in the driving cab in an electric car is able to send a target speed signal $f_{pp}$ by a master controller to a terminal 9 as shown in FIG. 1. Shown at 10 is a function generator which compares the target speed signal $f_{pp}$ and the running speed $f'_f$ of the electric car to produce an output if the difference between both the speeds is a predetermined value or less, but not to produce an output if the difference is higher than the value. The speed difference (abscissa) vs. output (ordinate) characteristic is schematically shown within the block 10. The polarity of the input signal is switched between the powering and regenerative operations, and in the Figures, the polarity of the input signal for the regenerative operation is shown in parentheses.

A slip frequency command $f_{sp}$ for the induction motor is previously established and applied to a terminal 11. Shown at 12 is a subtracter for subtracting the output of the function generator 10 from the slip frequency command $f_{sp}$. If an electric car is accelerating or decelerating, the difference between the target speed command $f_{pp}$ and the running speed $f'_f$ is large enough and the output of the function generator 10 is zero. Therefore, the output $f_s$ of the subtracter 12 is equal to the command $f_{sp}$. When the actual running speed $f'_f$ approaches the target speed $f_{pp}$, the slip frequency $f_s$ is made small. This slip frequency $f_s$ is applied to an input of an adder and subtracter 13, and the actual running speed $f'_f$ of electric car is applied to the other input of the adder and subtracter 13. Thus, the frequency produced by the power converter 5, i.e. the frequency command $f_p$ is given by $$f_p = f'_f + f_s \text{ (at the powering operation)} \qquad (3)$$

$$f_p = f'_f - f_s \text{ (at the regenerative operation)} \tag{4}$$

The frequency command $f_p$ thus determined by the above equations is applied to a frequency control device 14 the output of which controls the output frequency of the power converter 5.

If such a frequency control system is employed, it is possible to provide an electric car control apparatus which makes it possible to effectively use the constant speed characteristics of the induction motors 61 to 64 and to excellently provide recovery of adhesion even though skid or slide occurs.

If, at the powering or regenerative operation, the driving wheels 71 to 74 cause skid or slide, the rotational speed of the induction motors 61 to 64 are rapidly increased or decreased. However, the frequency command $f_p$ supplied to the frequency control device 14 is determined by the above equations (3) and (4) and the signal $f'_f$ of the actual running speed of electric car as shown in these equations (3) and (4) is independent of the adhesion or non-adhesion of the driving wheels. Therefore, the power converter 5 continues to generate the AC voltage the frequency of which is almost unchanged as compared with that immediately before skid or slide occured. As a result, the induction motors 61 to 64 are constantly supplied with power, and thus the inherent constant speed characteristic of the motors, that is, the characteristic that, when the speed rapidly increases at the powering operation (the speed rapidly decreases at the regenerative operation), powering (regenerative) torque decreases to thereby suppress the rapid change in speed, can be effectively used, enabling provision of an electric car control apparatus capable of providing an excellent adhesion property.

A current or voltage control system will next be described. In electric cars, a constant torque control or constant current control system is provided in order to keep a regulated speed which is determined by riding quality required at the powering and regenerative operations. A current command $I_p$ is sent to a terminal 15 and applied through an analog to digital converter 301 to an input/output device 101. The signal $f'_f$ of the actual running speed of electric car as the output from the speed detector 80 is also applied through an analog to digital converter 302 to the input/output device 101. The output of the adder and subtracter 13, or the frequency command $f_p$ is applied through an analog to digital inverter 303 to the input/output device 101. Moreover, a voltage detector 16 detects an output $v_f$ of the power converter 5 and supplies it through an analog to digital converter 304 to the input/output device 101. This input/output device 101 combines the three signals, the signal $f'_f$ of the actual running speed of the electric car, the frequency command signal $f_p$ and the output voltage signal $v_f$ to determine a single address. Then, the content of a storage device 200 at this address is read out to thereby predict a current value $I_f$ which will flow through the induction motors 61 to 64. On the other hand, the current command value $I_p$ corresponding to this predicted current value $I_f$ has been entered and thus the difference of both the signals, $\Delta I = I_p - I_f$ is computed. Consequently, a voltage command $v_p$ is applied through a digital to analog converter 305 to a voltage control device 17 the output from which thus controls the output voltage of the power converter 5.

The relation among the AC voltage $v_f$ applied to the induction motors 61 to 64, its frequency $f_p$, the number of revolutions $f'_f$, and the current $I_f$ is obtained in advance by experiments or the like. The storage device 200 stores on the basis of these relations signals corresponding to the current $I_f$ determined by the values of the voltage $v_f$, the frequency $f_p$, and the number of revolutions $f'_f$ at addresses determined in accordance with the combination of the voltage $v_f$, the frequency $f_p$, and the number of revolutions $f'_f$.

Figure 2:
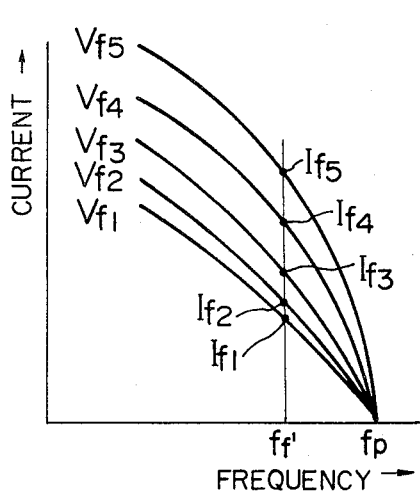
FIG. 2 is a graph showing a speed (frequency)-current characteristic of an induction motor.

FIG. 2 shows a speed (frequency) vs. current characteristic of the induction motor in which the voltage is used as a parameter. The current into the induction motor can be predicted by use of FIG. 2 as will be described below.

When the AC voltage of frequency $f_p$ applied to the induction motors 61 to 64 from the power converter 5 is changed as $v_{f1}$ to $v_{f5}$, the current as shown in FIG. 2 flows into the motors 61 to 64. If the rotational speed $f'_f$ of the motor is determined, the motor current $I_f$ can be predicted as $I_{f1}$ to $I_{f5}$.

If the driving wheels 71 to 74 cause adhesion, the motor current $I_f$ can be detected directly by the current detector. If, however, the driving wheels 71 to 74 cause skid or slide, the motor current rapidly decreases. At this time, when use is made of the conventional constant current control system for controlling the motor current to be constant, a sufficient adhesion property cannot be obtained.

The above point will be described with reference to FIG. 3 which shows the speed (frequency) vs. torque characteristic of the induction motor.

It is now assumed that the operating point of the induction motor is at point A. If a skid of driving wheel occurs, the operating point moves in the arrow-B direction along a torque characteristic $T_1$ of the induction motor as long as the voltage and frequency applied to the motor are not changed. Consequently, the powering torque decreases and thus adhesion is caused again with the result that the operating point returns to point A. However, if the operating point tends to move in the arrow-B direction, the motor current $I_f$ becomes decreased, and therefore the output voltage from the power converter 5 is increased so as to keep the current command $I_p$ corresponding to the torque $T_p$ by the action of constant current system. As a consequence, the output voltage is increased so that the operating point can be moved in parallel from point A to C. Thus, the operating point is moved in the arrow-D direction along a torque characteristic $T_2$ for the maximum output voltage to reach recurrence adhesion.

In other words, recurrence of adhesion is delayed by the time during the operating point moves point A to C.

Figure 3:
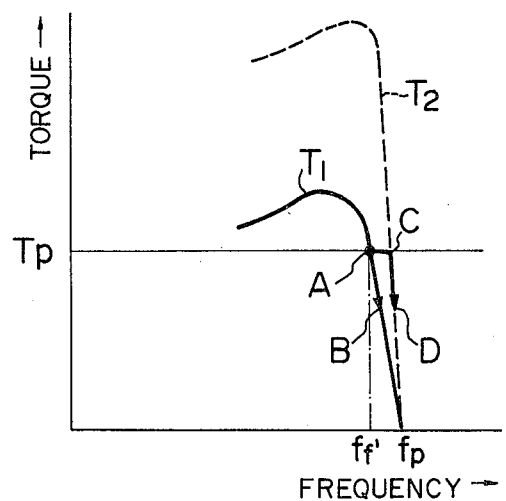
FIG. 3 is a graph showing a speed (frequency)-torque characteristic of an induction motor.

On the other hand, if the induction motor current is predicted under the assumption that the driving wheels cause adhesion even though the driving wheels 71 to 74 cause skid or slide and if use is made of a constant current control system for maintaining the motor current constant, the operating point as shown in FIG. 3 can be moved directly from point A in the arrow-B direction and the adhesion property can be improved.

The driving wheels 71 to 74 or the trailing wheel 70 changes in diameter as times go. Thus, even when the driving wheels 71 to 74 are in the adhesion condition, the output $f'_f$ of the speed detector 80 becomes unequal to the output $f_f$ of the speed detectors 81 to 84. Therefore, it is desirable to correct the wheel diameter during coasting of electric car in which the driving wheels 71 to 74 are seemed to surely cause adhesion.

During coasting of electric car, the outputs $f_{f1}$ to $f_{f4}$ from the speed detectors 81 to 84 are entered through an analog to digital converter 300 to an input/output device 100 where they are averaged into a mean value $f_f$. Then, the mean value is divided by the output signal $f'_f$ which is at the same time, entered from the speed detector 80, that is, $K=f_f/f'_f$ is computed. The result K of the operation is sent through a digital to analog converter 306 to a multiplier 18. The output of the multiplier 18 thus equals to the mean value $f_f$ of the outputs of the speed detectors 81 to 84 during coasting of electric car. If the result K of the above operation is held until the next coasting of electric car, the correction of driving wheel diameter can be made at the powering or regenerative operation between coasting operations, thereby providing the signal $f'_f$ of the actual running speed of electric car.

Figure 4:
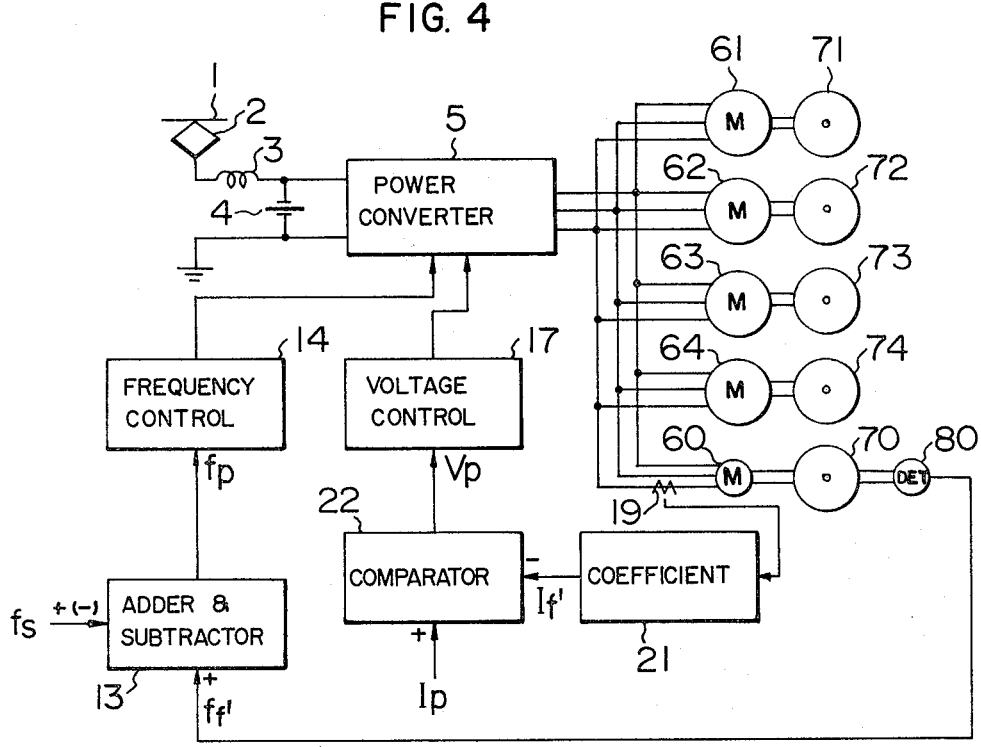
FIG. 4 is a block diagram of another embodiment of a control apparatus for an electric car according to the invention.

FIG. 4 is another embodiment of an electric car control apparatus according to the invention. In FIG. 4, like elements corresponding to those of FIG. 1 are identified by the same reference numerals. The different point is that the current into the induction motors 61 to 64 when it is assumed that the driving wheels 71 to 74 cause adhesion can be predicted by use of a small-capacity induction motor 60.

Specifically, the trailing wheel 70 is connected to the second induction motor 60 which is much smaller in capacity than and similar in torque characteristic to the main induction motors 61 to 64. To the second induction motor 60 is also supplied power from the power converter 5. However, since the capacity of the induction motor 60 is small enough, the trailing wheel 70 causes adhesion even in the situation that all the driving wheels 71 to 74 cause skid or slide. The current flowing into the motor 60 is proportional to that flowing into the main motors 61 to 64. Thus, the current in the motor 60 is detected by a current detector 19 the output of which is applied to a coefficient device 21 from which is thus produced a current signal $I'_f$ simulating the current in the main motors 61 to 64. This current signal $I'_f$ is compared with the current command $I_p$ in a comparator 22, the difference output therefrom being applied to the voltage control device 17 the output of which acts to control the output voltage from the power converter 5.

In this way, if the constant current control system is used for maintaining the current in the second motor 60 constant which current simulates the adhesion condition of the main motors 61 to 64, an electric car control apparatus can provide an excellent adhesion property.

If, now, the driving wheels 71 to 74 cause skid or slide, since the trailing wheel 70 causes adhesion, the speed feedback value $f'_f$ of the rotational speed of the trailing wheel 70, and the current feedback value $I'_f$ are the same as in the adhesion condition of the driving wheels. Thus, similar to the previous embodiment, the frequency command $f_p$ is not changed by the influence of the skid or slide of the driving wheel, and the skid or slide is not promoted. In addition, the voltage command $v_p$ is not affected by variation of current into the induction motors 61 to 64 to delay recurrence of adhesion, and thus it is possible to obtain an adhesion property realized by effective use of the inherent constant speed characteristic of the induction motor.

Figure 5A:
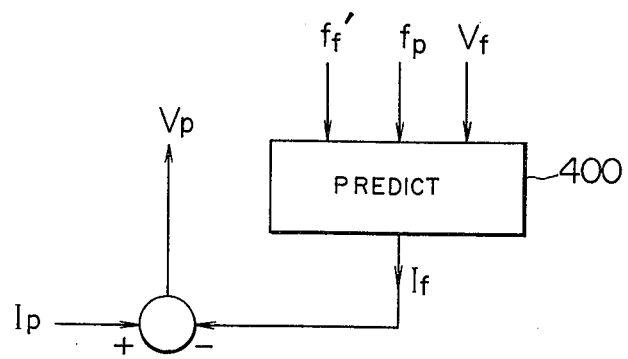
FIGS. 5A and 5B show function diagrams for showing the functions of a constant current control system in FIG. 1 and of a voltage control system according to a modification thereof.
Figure 5B:
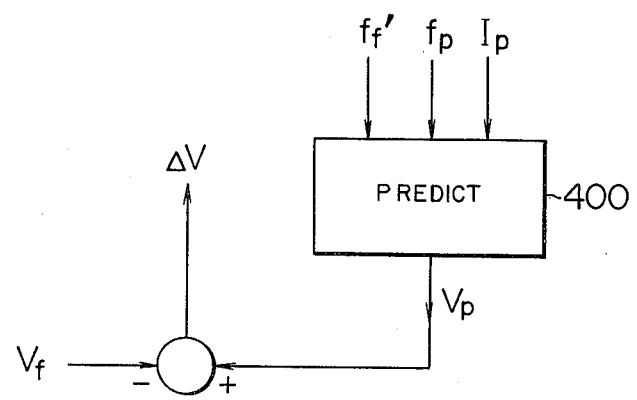

Although in the embodiment of FIG. 1 the constant current control system is constructed which predicts the current $I_f$ from the relation among the frequency $f_p$, voltage $v_f$, running speed $f'_f$ and current $I_f$, a voltage control system may be constructed which determines the voltage command $v_p$ to be supplied to the motors, by the inputs of the frequency $f_p$, running speed $f'_f$ and current $I_p$ in place of the voltage $v_f$, and compares it with the feedback voltage $v_f$. Also with this voltage control system, the motor current $I_f$ can be kept substantially constant and the adhesion property can be improved. FIG. 5A shows a function diagram for showing the function of the constant current control system in FIG. 1, and FIG. 5B shows a function diagram for showing the function of the voltage control system according to this modification. The block 400 designates the predicting operation made by the input/output device 101 and the storage device 200. A control command $\Delta V$ is applied to the voltage control device 17 to control the output voltage of the power converter 5.

What is claimed is:

1. A control apparatus for an electric car having power converting means for converting electric power received from a trolley wire to polyphase AC power of variable frequency, a driving wheel and an induction motor supplied with said polyphase AC power and coupled to said driving wheel, said control apparatus comprising:
   detector means for detecting the actual running speed of the electric car irrespective of whether said driving wheel causes adhesion or non-adhesion;
   means for establishing a slip frequency of said induction motor;
   frequency command means for adding said slip frequency to said actual running speed signal in response to powering operation of the electric car and subtracting said slip frequency from said actual running speed signal in response to a braking operation of the electric car; and
   means for controlling the output frequency of said power converting means in accordance with a frequency command from said frequency command means.

2. A control apparatus according to claim 1, wherein said means for detecting said actual running speed comprises a trailing wheel which is not connected to said induction motor and means for detecting the number of revolutions of said trailing wheel.

3. A control apparatus according to claim 2, further comprising:
   means for detecting a speed of said induction motor;
   means for computing a ratio between said motor speed signal and said actual running speed signal when the electric car is coasting; and
   means for modifying the succeeding actual running speed signal in accordance with an output of said computing means.

4. A control apparatus according to claim 3, wherein said modifying means comprises means for multiplying the output of said trailing wheel revolution number detecting means by said ratio.

5. A control apparatus according to claim 3, wherein said means for detecting the speed of said induction motor comprises means for detecting an average speed of a plurality of induction motors connected to a plurality of driving wheels.

6. A control apparatus according to claim 1, further comprising:
   means for establishing a current command for said induction motor;
   means for detecting the actual current of said induction motor; and means for controlling the output voltage of said power converter means in accordance with a difference between said current command and said actual current.

7. A control apparatus according to claim 1, in which said electric car has a second driving wheel, and further comprising:
a second induction motor which is supplied with said polyphase AC power, connected to said second driving wheel and having a much smaller capacity than said first-mentioned induction motor;
means for establishing a current command for said second induction motor;
means for detecting an actual current of said second induction motor; and
means for controlling the output voltage of said power converter in accordance with a difference between said current command and said actual current.

8. A control apparatus according to claim 1, further comprising:
means for establishing a current command of said induction motor;
means receiving as input signals said current command, said actual speed signal and said frequency command for predicting a voltage applied to said induction motor under adhesion condition; and
means for controlling the output voltage of said power converter means in response to the predicted voltage.

9. A control apparatus according to claim 8, wherein said voltage predicting means includes means for storing a relation among a frequency, voltage and current applied to said induction motor, and a speed of said induction motor, under adhesion condition, and input/output device means for receiving each of said input signals and for delivering the voltage to be applied to said induction motor.

10. A control apparatus according to claim 1, further comprising:
means for detecting an output voltage of said power converter means;
means receiving as input signals said output voltage signal, said frequency command and said actual speed signal for predicting a current flowing into said induction motor under adhesion condition;
means for establishing a current command for said induction motor; and
means for controlling the output voltage of said power converter means in response to a difference between said current command and said predicted current.

11. A control apparatus according to claim 10, wherein said current predicting means includes means for storing a relation among a frequency, voltage and current applied to said induction motor, and a speed of said induction motor, under adhesion condition, and input/output device means for receiving each of said input signals and delivering the predicted current flowing into said induction motor.

12. A control apparatus according to claim 1, further comprising means for establishing a running speed command for the electric car; and means for reducing said slip frequency in response to approaching of said actual running speed to said running speed command.

13. A control apparatus for an electric car havng power converter means for converting electric power received from a trolley wire to polyphase AC power of variable frequency, and a main induction motor which is supplied with said polyphase AC power and connected to drive a first driving wheel of the electric car, comprising:
frequency command means for generating a frequency command signal;
means for suppressing the output of said frequency command means in rapid variation in response to a skid or slide of said driving wheel;
means for controlling an output frequency of said power converter means in response to said frequency command signal from said frequency command means;
a second induction motor which is supplied with said polyphase AC power, connected to a second driving wheel and having a much smaller capacity than said main induction motor;
means for establishing a current command for said second induction motor;
means for detecting an actual current of said second induction motor; and
means for controlling the output voltage of said power converter means in response to the difference between said current command and said actual current.

14. A control apparatus for an electric car having power converter means for converting electric power received from a trolley wire to polyphase AC power of variable frequency, and an induction motor supplied with said polyphase AC power and connected to drive a driving wheel of the electric car, comprising:
frequency command means for generating a frequency command signal;
means for suppressing the output of said frequency command means in rapid variation in response to a skid or slide of said driving wheel;
means for controlling an output frequency of said power converter means in accordance with a frequency command;
means for detecting an output voltage of said power converter means;
means supplied with said output voltage signal, said frequency command signal and an actual speed signal as input signals to predict a current flowing into said induction motor under adhesion condition;
means for establishing a current command for said induction motor; and
means for controlling an output voltage of said power converter means in response to a difference between said current command and said predicted current.

15. A control apparatus according to claim 14, wherein said current predicting means includes means for storing a relation among a frequency, voltage and current applied to said induction motor, and a speed of said induction motor, and input/output device means for receiving each of said input signals and for delivering a predicted current to said induction motor.

* * * * *